Figure 1:
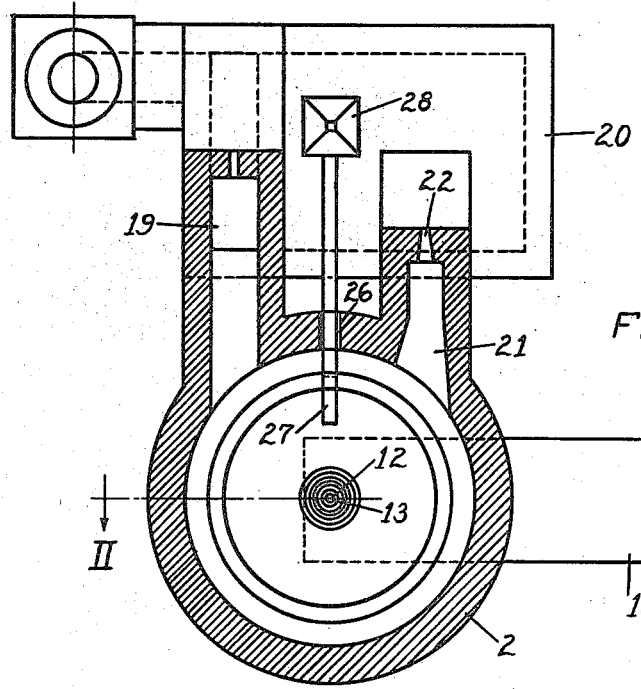

Sept. 26, 1933.   W. A. MORTON ET AL   1,928,598
ROTARY GLASS MELTING FURNACE
Filed Jan. 15, 1930   3 Sheets-Sheet 1

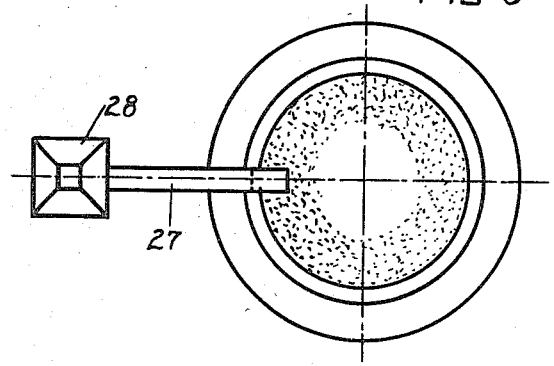
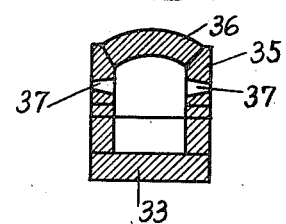
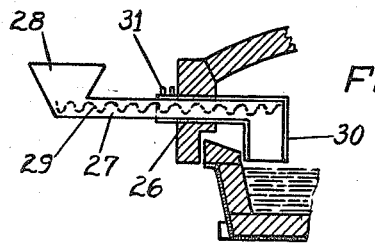
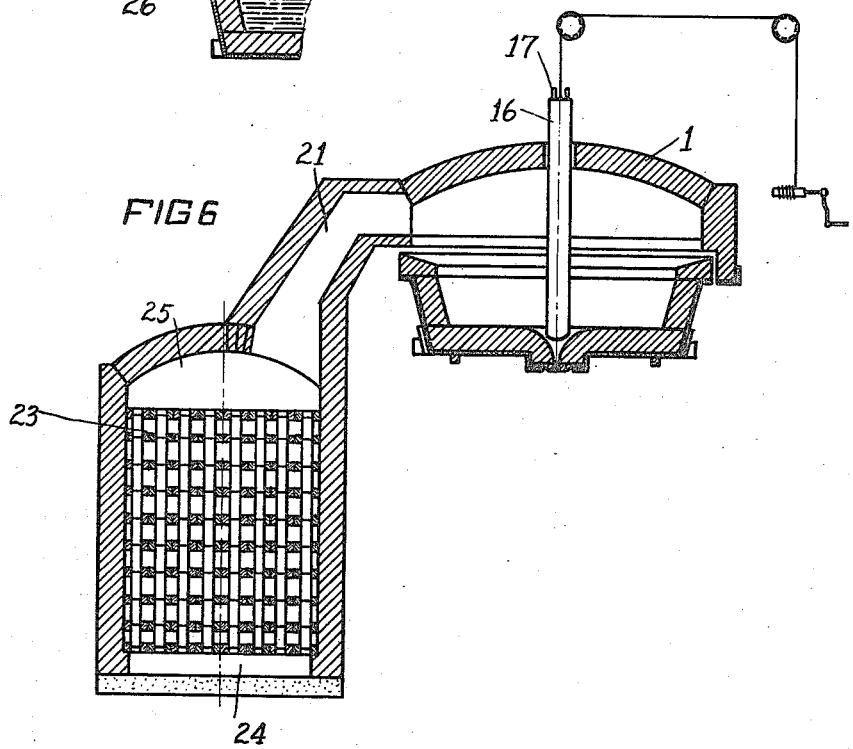

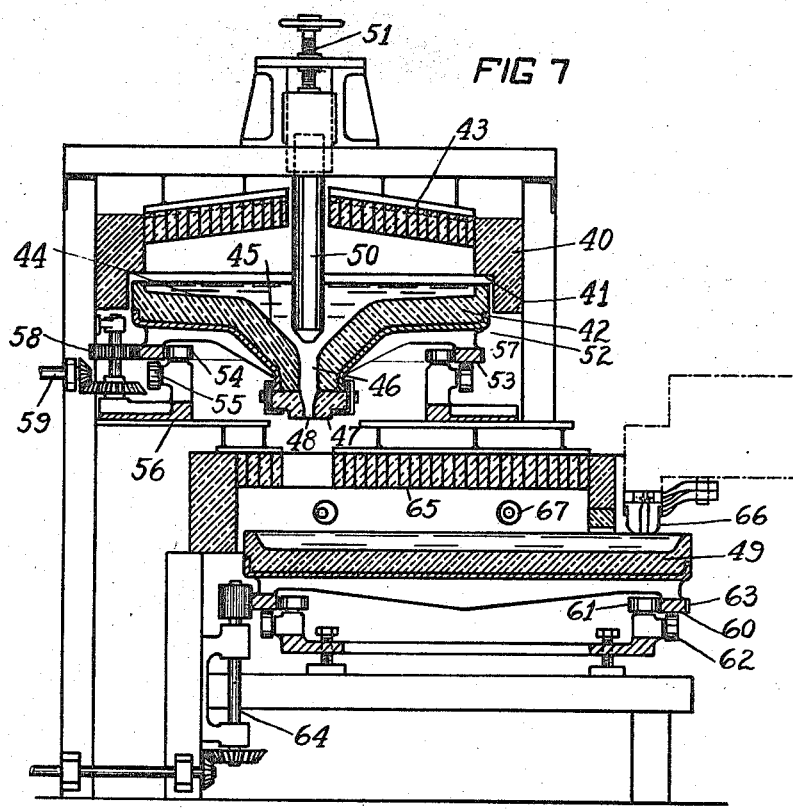

Patented Sept. 26, 1933

1,928,598

UNITED STATES PATENT OFFICE 1,928,598

ROTARY GLASS MELTING FURNACE

William A. Morton and Paul L. Geer, Pittsburgh, Pa., assignors to Amco, Incorporated, Pittsburgh, Pa., a corporation of Pennsylvania Application January 15, 1930. Serial No. 420,935

3 Claims. (Cl. 49—54)

This invention relates to improvements in the method of and apparatus for melting glass and it is among the objects thereof to provide a glass melting furnace which shall be adapted to spread the raw batch material continuously and uniformly over the pool of glass and which may be adapted to discharge the molten glass in a continuously uniform stream.

Another object of the invention is the provision of continuous heating means for melting the glass and means for regulating the melting speed of the furnace independently of or jointly with the heat regulating means.

Another object of the invention is to provide a glass melting furnace in which the raw batch material is placed in a melting furnace and the melted glass subsequently discharged into a working tank wherein it is maintained at uniform working temperature unaffected by the charging of batch material into the furnace.

Another object of the invention is to provide a furnace of the above designated character in which the raw materials are moved into heating proximity with the heating means at a rate in excess of the natural flow due to glass displacement occasioned by the discharge of the material from the furnace.

Another object of the invention is to provide means for melting and refining glass in the same body, having the several stages of glass formation in a vertical plane.

And still another object of the invention is the provision of a glass melting furnace adapted to discharge the glass by gravity to a receiving member movable with respect to a glass forming machine preferably of the suction type.

Continuous glass melting furnaces heretofore employed, embodied a stationary hearth in which the raw batch material was continuously fed from one end to the high temperature zone, and the refined glass was withdrawn or discharged at the opposite end of the tank.

In accordance with the present invention a rotary tank or hearth is utilized in the melting and refining of the raw material and a separate stationary or rotary working tank is employed for receiving the melted glass from the melting furnace to more readily maintain the glass at proper working temperatures.

By utilizing a rotary melting tank the glass is melted and refined in a single pool. The raw materials are spread over a large surface instead of being deposited in a concentrated mass in one end of the furnace, as heretofore practiced. Also the rotation of the hearth enables the heat to be applied to all portions of the hearth in which raw materials are floating, resulting in a maximum heat transfer between the heating medium and batch materials, whereby the melting rate of the furnace is accelerated.

Another advantage in the utilization of a rotary hearth lies in the applicability of variable speed drive mechanism for rotating the hearth whereby the speed of rotation may be varied to obtain the desired melting speeds, and because of the floating mass of raw material on the surface and in the difference in the viscosity of the melted and raw materials, the latter will move towards the outer edge of the tank away from the axis of rotation, leaving the melted and refined mass in the center of the tank from which it is withdrawn in a continuous stream. The raw materials being lighter, will be on the surface, the refining glass below and the heavier refined glass on the bottom.

By utilizing the rotary working tank type for supplying glass to a ware forming machine, or to a final discharge point, the glass in the supply pool is maintained in motion with respect to the receiving member of such forming machine whereby a fresh supply of glass is available for the successive charges.

Figure 2:
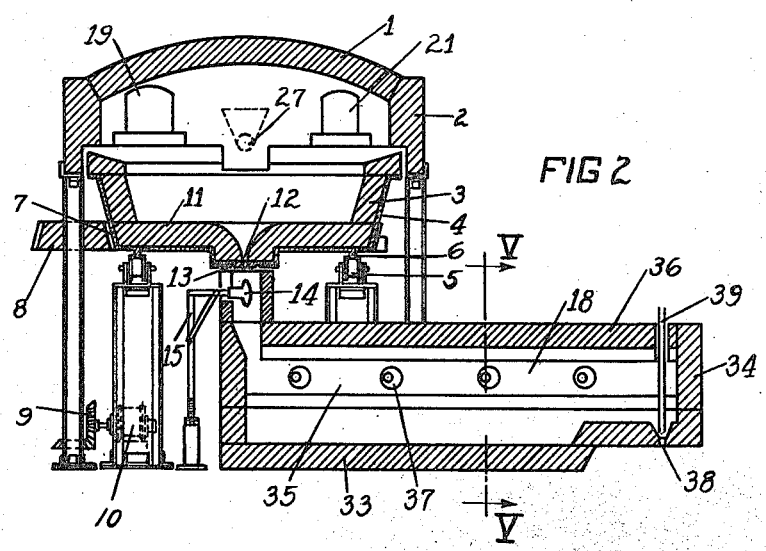

The several features and advantages of the rotary glass melting furnace and separate working tank will become more apparent from a consideration of the accompanying drawings in which like reference characters designate like parts and in which Figure 1 is a plan view of a glass melting furnace embodying the principles of this invention; Figure 2 a cross sectional view of the glass melting furnace and working tank taken along the line II—II of Fig. 1; Figure 3 a plan view of the rotary hearth and batch feeder; Figure 4 a detail view of the feed mechanism showing a portion of the furnace in cross section; Figure 5 a cross sectional view of the working tank taken along the line V—V, Figure 2; Figure 6 a cross sectional view of the glass melting furnace and recuperator for preheating the air passing to the burner ports for utilizing the heat of the waste gases leaving the furnace; and Figure 7 a vertical sectional elevational view of a somewhat modified form of the furnace.

Referring to Figures 1 and 2 of the drawings, the structures therein illustrated comprises an arched roof 1 and a substantially annular wall structure 2 forming a heating chamber in which is mounted for rotation a circular tank 3 of suitable refractory material which may be enveloped by a metal housing 4. The housing 4 is mounted on a plurality of rollers 5 the housing being provided with an annular vertically depending track 6 which rides on the rollers 5 and the latter constitutes the hearth support. The shell 4 is provided with gear teeth 7 on its outer periphery for engagement with a drive gear 8 that is actuated by gear wheels 9 and a prime mover such as the motor 10, the latter being provided with control means to operate the rotary tank or hearth at variable speeds.

The hearth 11 of the tank is provided with a central opening 12 having a replaceable bushing 13 to enable proper control of the glass flow and the opening in the bushing is controlled by a valvular plug 14 which is preferably provided with means for circulating a cooling medium through its support 15.

As shown in Figure 6, the opening 12 of the hearth may also be controlled by a plug 16 having pipes 17 therein for circulating cooling medium, this latter plug projecting through the roof 1 of the melting furnace and being especially adapted to stop the opening 12 to prevent the discharge of glass from the melting tank, if for any reason the material cannot be withdrawn from a working tank 18 which is below and receives the refined glass from the melting tank through the opening 12 in the hearth.

The wall 2 of the furnace is provided with a passage 19 through which the hot waste gases pass into a recuperator structure generally designated at 20, Fig. 1, and which is more clearly shown in Fig. 6 of the drawings. Wall 2 is further provided with a passage 21 connected by an air passage (not shown) to the recuperator 20 and provided with a burner port 22 through which the raw producer gas or other fuel is conducted to the furnace.

The recuperator, Fig. 6, consists of flue tile 23 forming passages through which the hot waste gases from the passage 19 of the furnace are directed back and forth and air is conducted from the chamber 24 underneath the tile and drawn up to the dome portion 25 from which it enters the passage 21 leading to the fuel entrance of the melting chamber. The heat exchange effected by the tile, preheats the air entering the furnace thereby raising the temperature of combustion to provide for the efficient heating of the raw material.

The melting furnace is further provided with an opening 26 through which a conveyor element 27 projects into the furnace chamber, this being more clearly shown in Fig. 4 of the drawings.

The material feeding element comprises a hopper 28 in which a feed screw 29 constitutes a conveyor for directing the batch material to the melting tank. As shown in Fig. 4 the conveyor terminates in a spout 30 at the outer periphery of the circular tank, the raw materials being spread on the surface of the tank in the manner illustrated in Fig. 3 of the drawings. The housing or portion of the conveyor extending into the furnace may be water cooled by providing circulating pipes 31 to prevent excessive heating.

With reference to Fig. 2 of the drawings, the working tank 18 in which the melted glass is received from the tank 3, consists of a stationary hearth 33 with end, side and top walls 34, 35 and 36 respectively. The side walls are provided with burner ports 37 and a feeder passage 38 is provided at one end of the hearth and controlled by a plug 39.

With reference to Fig. 7 of the drawings the melting furnace is shown as having an annular heat retaining wall 40 of suitable refractory material in an off-set portion 41 of which the rotary hearth 42 is mounted. A flat roof 43 of conical shape is provided to reflect the heat to the center of the melting chamber.

The hearth 42 is shallow and is provided with a gradually tapering bottom 44 which taper is more pronounced at 45 near the center of the hearth and terminates into a central passage 46. A renewable bushing 47 of refractory material is provided below passage 46 and an opening 48 of the bushing controls the volume of the glass stream passing to the working tank 49. A refractory plug or stopper 50 is disposed through the roof 43 and is adapted by a screw mechanism 51 to control the passage 46 or to entirely close the same.

The hearth 42 is provided with a bottom metal liner 52 having an annular track 53 which is adapted for engagement with a series of angularly spaced side and bottom rollers 54 and 55 respectively which are mounted on a supporting casting 56. Track 53 is provided with gear teeth 57 for interacting engagement with a gear wheel 58 of a drive mechanism 59.

The working tank 49 is a rotary element which is similarly supported and driven by an annular track 60 having supporting rollers 61 and 62 and gear teeth 63 for engagement with a drive mechanism 64 that is operatively connected with the melting tank drive 59.

A roof or cover 65 is provided over the working tank 49 leaving a small portion of the tank extending beyond to expose the glass pool to the parison molds 66 of a suction forming machine. Burners 67 may be provided to maintain the glass in the working tank at suitable working temperatures.

In the operation of the rotary glass melting furnace, raw material is fed through the hopper and conveyor mechanism to the rotary tank in which it is spread uniformly over the melted glass near the outer periphery of the tank by the rotary motion of said tank. Heat is applied through the burner port 22 which is offset from the center of the rotary tank so that the flame stream is directed tangentially and in the path of the raw materials floating on the melted glass. With this moving of the raw material in proximity with the flame stream heat exchange between the raw material and heating means is greatly facilitated and the melting speed of the furnace can be controlled by regulating both the intensity of the heating means and the speed of rotation of the melting tank, or either means of regulation may be employed.

Because of the difference in viscosity, the raw material will stay in the region of the outer periphery and at the top of the tank and the melted glass will feed towards the center of the tank and to the bottom thereof, at which point it is withdrawn through the opening 12, Fig. 2, or 48 Fig. 7, and discharged into the working tank 18, Fig. 2 or 49 Fig. 7. In this manner the melting of the material and the refining of the glass are accomplished in the same body with the several stages of the glass formation in a vertical plane.

The method of rotation of the hearth whereby the newly fed batch material is quickly brought into the path of the flame prevents vaporization of the flux elements, except in the presence of temperatures sufficiently high to fuse the silica ingredients which form the base of glass.

In the working tank the glass is maintained at suitable working temperature by regulation of the heating medium injected through the burner ports 37 so that glass at proper working temperatures is always available at the glass feeding end 38 of the working tank.

It is evident from the foregoing description of this invention that rotary glass melting furnaces provide for the continuous melting of glass of uniform quality. It is further evident that the glass may be withdrawn directly from the rotary tank for use in molding machines or the like, or that any form of working tank may be employed with the melting tank.

Although one embodiment of the invention has been herein set forth and described, it will be obvious to those skilled in the art that various modifications may be made in the details of construction and in the arrangement of the several cooperating parts without departing from the principles herein set forth.

We claim:

1. In a glass melting furnace the combination with a rotary melting tank of means for distributing raw material in said tank and means for withdrawing molten glass from a submerged orifice at the bottom in the center of said tank.

2. In a glass melting tank the combination with a combustion chamber of a rotary melting tank, a rotary receiving tank below said melting tank, means for continuously feeding raw material to the melting tank, said tanks being rotatable about vertical axes, means for continuously delivering refined glass to the receiving tank and means for controlling the flow of glass from the melting tank to the receiving tank.

3. A glass melting furnace comprising a rotary hearth having an inclined glass supporting surface terminating into a discharge orifice at the center thereof and having its axis of rotation disposed in a vertical plane, means for distributing batch material on the surface of the glass pool in said hearth near the outer edge thereof and means for directing a flame stream in the path of movement of the batch material in the melting tank.

WILLIAM A. MORTON.
PAUL L. GEER.